United States Patent Office 3,230,420
Patented Jan. 18, 1966

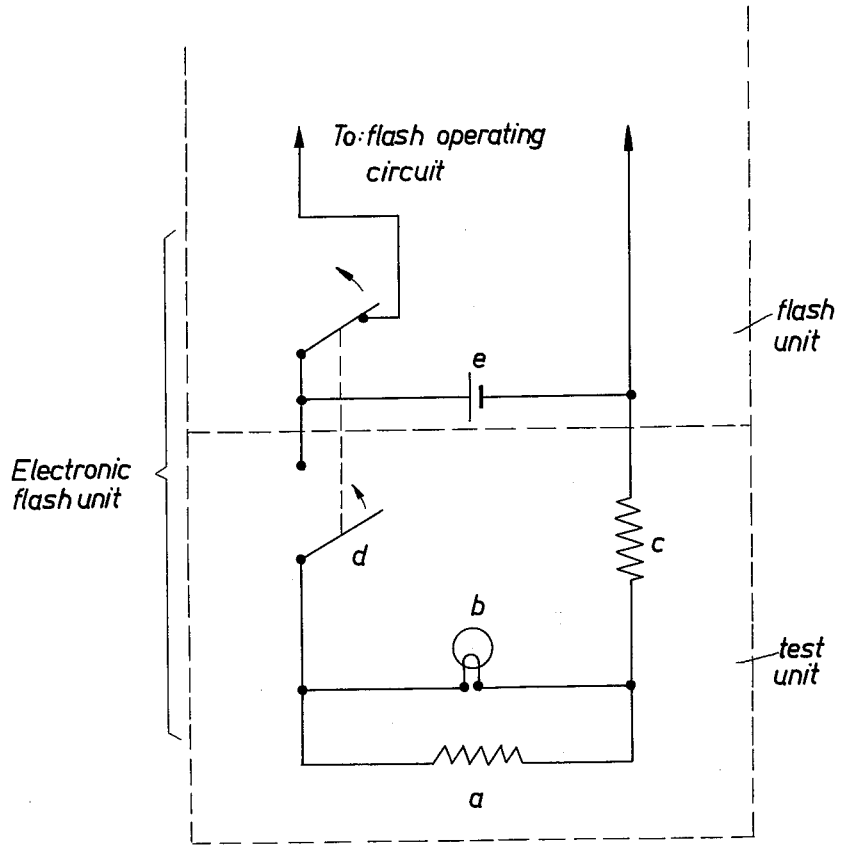

3,230,420
CIRCUIT ARRANGEMENT FOR TESTING THE BATTERIES INCORPORATED IN ELECTRONIC FLASH UNITS
Paul Kapteyn, Berlin, Germany, assignor to Loewe Opta AG, Berlin, Germany, a company of Germany
Filed Nov. 23, 1962, Ser. No. 239,838
Claims priority, application Germany, Nov. 25, 1961, L 40,547
1 Claim. (Cl. 315—129)

Electronic flash units incorporate as the source of current almost exclusively dry batteries or storage batteries. Once this source of current is exhausted it is no longer possible to obtain from these units flashes of full intensity. The imminent exhaustion of the batteries is in the flash units at present in commercial circulation admittedly perceptible from the gradual prolongation of flash delay, but this possibility must be regarded as very inexact and uncertain.

A further method hitherto applied to enable timely recognition of the imminent exhaustion of the battery consists in applying small globules as floating bodies in the electrolyte, which as a result of the change in specfic gravity of the fluid electrolyte caused by the increasing exhaustion of the charge adopt a different position in height in the electrolyte. This method is therefore restricted to batteries with a fluid electrolyte, i.e. mainly to lead storage batteries.

A suggestion has also been made of measuring with a meter the voltage of the battery, the level of which is in a certain respect dependent on the degree of exhaustion of the battery. But it has been shown that e.g. the idle voltage only changes relatively little up to the complete discharging of many batteries. The "operating voltage" in flash units is also not suitable as a basis for judgement, as because of the changing level of operating current in the course of discharging the storage condenser the "operating voltage" is not characterized by constant value.

The subject of the invention, now, is an arrangement which is not subject to these disadvantages and restrictions and is in principle suitable for all types of battery.

Furthermore, it is known to design an electrical testing device as a small and compact unit forming a portable instrument adapted for the approximate determination of differences of potential.

It is known, too, to use for such purposes an electric voltmeter consisting of a tubular casing which contains a small incandescent lamp and a constant resistance in series with it, the value of the resistance being so determined that the lamp begins visibly to glow just at said voltage, and which is provided with a fixed terminal contact and a movable terminal contact and an opening in order to permit the glowing of the lamp to be observed.

The present invention, however, relates to a combination of a battery operated electronic flash unit with an electric system testing the degree of exhaustion of said battery incorporated in said flash unit.

In accordance with the invention an electronic flash unit operating from an incorporated battery is combined with an electrical testing circuit system comprising a switch, an electrical miniature lamp of the filamentary type, a first ohmic resistance and a second ohmic resistance, said first ohmic resistance and said electrical miniature lamp being connected in parallel, and this parallel connection circuit being connected in series with said switch, said incorporated battery to be tested, and said second ohmic resistance, said first ohmic resistance being rated so that said switch in closed condition is adapted to let light up said lamp with barely visible intensity, when the voltage of said incorporated battery is still adequate for producing a limited flash number in the order of 5 to 10 flashes by means of said flash unit.

An exemplary embodiment of the invention is shown in the accompanying drawing wherein the testing circuit connected with the operating circuit is shown schematically indicating the mechanical connection of the switches in the flash unit and the test unit.

According to this illustration the parallel circuit consists of the small electric bulb $b$ and the ohmic resistance $a$, to which at discretion a further ohmic resistance $c$ is wired in series. The battery whose degree of exhaustion is to be checked is designated $e$. The simple switch $d$ is exemplarily designed in the manner of a bellpush and gives contact only for the duration of its operation.

The resistance $a$ is rated so that a relatively heavy current (with the battery $e$ fully charged) can be drawn off for a brief period. This current shall e.g. for nickel-cadmium storage batteries be about 50 to 300 times the charging current of these cells. By apropriate rating of the rated voltage of the bulb $b$ and of the series resistance $c$ it can then be achieved that on operation of switch $d$ the bulb $b$ lights up barely visibly when the battery is still able to provide the energy for the discharge of e.g. 5 to 10 flashes.

The effect of this circuit arrangement is particularly good because it has been shown that the inner resistance of the batteries represents a better criterion for the degree of discharge (exhaustion) than the idle voltage. Because of parallel resistance $a$ the voltage at bulb $b$ largely depends on the inner resistance of the battery $e$.

Appropriately means can be provided which enable push button $d$ to operate only when the operating switch of the electronic flash unit is at "off."

As may be seen from the drawing the mechanical connection between the switch $d$ and the switch $f$ arranged within the electronic flash unit and interrupting the operating circuit of the latter is designed in such a manner that an interruption of the flash unit operating circuit is effected as soon as the switch $d$ is closed.

The circuit arrangement in accordance with the invention has the advantage of being effective, cheap and compact. It can be constructed as a structural unit consisting of the elements $a$, $b$, $c$, $d$, and connectable to battery $e$.

What I claim is:

The combination of an electronic flash unit operating from an incorporated battery with an electrical circuit system for testing the degree of exhaustion of said incorporated battery, said electrical testing circuit system comprising a switch, an electrical miniature lamp of the filamentary type, a first and a second ohmic resistance, and means for interrupting the lead connecting said incorporated battery to said electronic flash unit, said first ohmic resistance and said electrical miniature lamp being connected in parallel, and this parallel connection circuit being connected in series with said switch, said second ohmic resistance, and said incorporated battery to be tested, said first ohmic resistance being rated so that said switch in its closed condition is adapted to light said lamp with barely visible intensity, when the voltage of said incorporated battery is still adequate for producing a limited flash number in the order of 5 to 10 flashes by means of said flash unit, said electrical testing circuit system being constructed as a structural unit of said flash unit supplied with means for its electrical connection with said enclosed battery to be tested, and said switch being connected with said interrupting means in such a manner that said switch is adapted to effect a closed condition of said interrupting means if the switch is in an opened condition, and an open condition of said interrupting means if the switch is in the closed position.

References Cited by the Examiner

UNITED STATES PATENTS

| | | | |
|---|---|---|---|
| 896,300 | 8/1908 | Jarvis | 324—29.5 |
| 3,118,137 | 1/1964 | Vincent | 324—29.5 |

JOHN W. HUCKERT, *Primary Examiner.*

DAVID J. GALVIN, *Examiner.*

L. ZALMAN, *Assistant Examiner.*